United States Patent [19]

Zaitoun et al.

[11] Patent Number: 4,842,071

[45] Date of Patent: Jun. 27, 1989

[54] PROCESS FOR THE SELECTIVE REDUCTION OF WATER INFLOWS IN OIL OR GAS PRODUCING WELLS

[75] Inventors: Alain Zaitoun, Rouen; Norbert Kohler, St Germain en Laye, both of France

[73] Assignee: Institut Francais du Petrole, Rueil-Malmaison, France

[21] Appl. No.: 164,939

[22] Filed: Mar. 7, 1988

[30] Foreign Application Priority Data

Mar. 6, 1987 [FR] France .............................. 87 03224

[51] Int. Cl.$^4$ .......................................... E21B 33/138
[52] U.S. Cl. .................................... 166/295; 166/294; 166/300
[58] Field of Search ................ 166/270, 294, 295, 300

[56] References Cited

U.S. PATENT DOCUMENTS

| | | | |
|---|---|---|---|
| 3,502,146 | 3/1970 | Hurd | 166/270 |
| 4,098,337 | 7/1978 | Argabright et al. | 166/294 X |
| 4,155,405 | 5/1979 | Vio | 166/295 |
| 4,498,539 | 2/1985 | Bruning | 166/294 |
| 4,744,418 | 5/1988 | Sydansk | 166/270 |

*Primary Examiner*—George A. Suchfield
*Attorney, Agent, or Firm*—Millen & White

[57] ABSTRACT

This process comprises injecting a non-hydrolyzed acrylamide polymer or copolymer into the producing formation and producing hydrolysis thereof in situ by subsequent injection of an alkali metal basic compound. It is then possible to restart the well in oil or gas production.

8 Claims, No Drawings

PROCESS FOR THE SELECTIVE REDUCTION OF WATER INFLOWS IN OIL OR GAS PRODUCING WELLS

BACKGROUND OF THE INVENTION

The present invention concerns a process for the selective reduction of water inflows from an oil or gas-producing formation towards a producing well without negative effect on the oil or gas production. This process is based on the injection into the formation, from said producing well, of an aqueous dispersion or solution of a nonhydrolyzed polyacrylamide or of a nonhydrolyzed acrylamide copolymer, followed with an alkali metal basic compound, for example a hydroxide, carbonate, phosphate, alcoholate or silicate, for the hydrolysis in situ of said polyacrylamide or copolymer.

Water, as brine, is often present in oil or gas-containing formations. The process of bringing into production of oil- or gas-containing reservoirs results in the concomitant flow into the producing well of water in such amount that great difficulties quickly arise. Such difficulties include formation of deposits in the well vicinity or in the tubing; increased corrosion of bottom or surface metal parts; increase of the pumped, transferred or stored fluid amounts; formation with oil of emulsions, which are sometimes difficult to break at the surface; and termination of the production of the wells.

Many methods for reducing water inflows in producing wells have been proposed and tested on the field. They generally consist of placing into the formation, at the water-oil or- gas interface, an impermeable barrier consisting of, for example, cements, resins or suspensions of solid particles. These plugging agents have the disadvantage of blocking oil or gas almost as mush as water, particularly when the water inflow results from the so-called coning phenomenon (formation of a water cone).

More recently, it has been proposed to use hydrosoluble polymers, particularly hydrolyzed polyacrylamides and various polysaccharides, optionally cross-linked by salts of multivalent, e.g trivalent, ions such as chromium and aluminum ions. It has been observed that, whereas this reticulation in the form of more or less compact gels results effectively in the discontinuation or reduction of the water inflow, it suffers from the disadvantage of also reducing to a large extent the oil or gas production.

Among the hydrosoluble polymers, polyacrylamides, particularly hydrolyzed polyacrylamides, are currently used to prevent water inflows in the producing wells. Their mechanism of operation is understood to be the following: the polymer, injected into the porous medium as aqueous solution, is adsorbed at the solid surface and reduces the pore diameter of the porous medium by swelling in contact with water; accordingly, the polymers slow down the water flow. On the contrary, non-aqueous fluids such as oil or gas do not swell the adsorbed macromolecules which, consequently, allow free passage to the flow of these fluids.

U.S. Pat. No. 3,308,885 discloses the use of hydrolyzed polyacrylamide in the production water. The method is not completely satisfactory, in particular in a formation of high permeability to water. As a matter of fact, such formations require the use of high polymer concentrations, resulting in difficulties in injecting the obtained highly viscous solutions. On the other hand, in this type of porous medium, the content of clay, hence of adsorbing sites, being relatively low, the polymer adsorption becomes more difficult.

U.S. Pat. No. 4,095,651 copes with some of these defects by recommending the dispersion of the hydrolyzed polyacrylamide in a water of higher salt content than that of the production water. The ionic strength increase of the polymer dissolving water has the effect of reducing the viscosity of the injected solutions, hence the pumping difficulties, and provides for a higher adsorption of the hydrolyzed polyacrylamide onto the wall of the porous media. However, the use of an injection water of higher salt content than that of the production water requires the addition of large salt amounts and often results in fluid-fluid and fluid-rock incompatibilities.

SUMMARY OF THE INVENTION

The object of the present invention is to reduce the water production in the production wells without decrease of the oil or gas production.

The process of the invention differs from a prior art enhanced oil recovery process wherein a polymer solution, generally at a concentration of the order of a few hundreds of parts per million, is subsequently or concomitantly injected with a solution of alkali metal basic compound, at a sufficient pressure to push the solution into the formation and thus displace a part of the oil of said formation, said part being recovered in so-called production wells, different from the injection wells. It is well known that the aqueous solutions of alkali metal basic compounds containing polymer, or pushed by a viscous polymer dispersion, thus provide for a better mobility control than water or the basic solution alone, to push the oil towards the production well.

This invention concerns a process for reducing or stopping water inflows from an oil or gas-containing formation or part of a formation, towards a well passing through said formation, said process comprising the following steps of:

(a) injecting into the formation, from the well, an aqueous solution (or dispersion) of a non-hydrolyzed polyacrylamide or a non-hydrolyzed acrylamide copolymer, which is adsorbed onto the rock of the formation, (b) subsequently injecting therein an alkali metal basic compound which, by contact with the polymer or copolymer adsorbed onto the rock, becomes hydrolyzed in situ, (c) restarting the well in oil and/or gas production, thus allowing the fluids of the formation to pass through the part thereof which contains the adsorbed polymer. The flow of oil and/or gas through said part of the formation, and hence the hydrocarbon production of the well, are not substantially different from their previous values before treatment, whereas the water production is reduced.

The use in this process of non-hydrolyzed polyacrylamide or of non-hydrolyzed acrylamide copolymer, followed with the hydrolysis in situ of the polymer or copolymer, offers the following advantages as compared with the injection of already hydrolyzed polyacrylamide.

Due to their essentially non-ionic character (less than 10%, preferably less than 5% by mole of ionic recurrent units) the non-hydrolyzed polyacrylamide or its copolymers are compatible with many different water types, irrespective of their particular mineral content, particularly of monovalent or divalent ions, and develop a viscosity substantially independent of the salt content. On the contrary, the viscosity of aqueous solutions of hydrolyzed polyacrylamide sharply drops with the increase of the dissolving water ionic strength, and precipitation, particularly of divalent ions, is liable to occur above a certain content of charged groups, depending on the polymer solution concentration, on the water ionic strength and composition, as shown in the communication of A. Zaitoun and B. Potié at "Société des Ingénieurs pétroliers" under reference SPE 11 785 of June 1983.

On the other hand, also as a consequence of its non-ionic character, the non-hydrolyzed polyacrylamide has an increased tendency to be adsorbed onto the mostly negatively charged surface of the minerals of the formation, whereas the hydrolyzed polyacrylamide, itself negatively charged in proportion to the carboxylic group content of its molecule, is on the contrary more or less repelled by these minerals. Of course, the process is increasingly effective as the specific surface of the minerals forming the reservoir rock increases. This specific surface is relatively low for sandstones and sands with low clay content, but relatively high for minerals of high clay content or for a carbonated rock.

By subsequent hydrolysis of non-hydrolyzed polyacrylamide adsorbed onto the wall of the porous media, it is possible, in turn, to locally increase the produced amount of hydrolyzed polyacrylamide which, by developing a higher viscosity, particularly in soft water, tends to reduce the water flow more than does the non-hydrolyzed polyacrylamide. The same observations apply to the above-mentioned copolymers.

The advantages of using the present process are then clearly apparent: compatibility of the polymer with production water, which may thus be reinjected, reduced viscosity at the injection, high adsorption onto the reservoir rock, and selective swelling in the presence of water, due to the hydrolysis of the adsorbed polymer.

The preferred polymer according to the invention is a non-hydrolyzed polyacrylamide of high molecular weight or a non-hydrolyzed non ionic copolymer of acrylamide, preferably in a proportion lower than 50%, with one or more comonomers, also non-ionic, preferably in a proportion higher than 50%, such for example as N-vinylpyrrolidone, as well as various vinyl ethers or esters, such for example as butyl methacrylate, methyl and glycidyl acrylates, vinyl acetate, etc. The term "non-ionic" excludes the presence in a substantial proportion of polyacrylic acid remainders or salts thereof. The polymer concentration of the aqueous solution is preferably as high as possible, provided it is compatible with the salt concentration of the medium. It is usually from 200 to 30,000 ppm (parts per million) by weight and preferably from 500 to 5,000 ppm by weight. The polymer is advantageously of high molecular weight, for example at least 500,000, preferably above $2.10^6$.

The nature of the basic agent is not critical, but alkali metal basic compounds, for example ammonium, sodium or potassium hydroxides, carbonates, phosphates, alcoholates or silicates, are preferred. The potassium basic compounds are preferred for their properties of stabilizing the clays of the formation. The concentration of alkali metal basic compound may vary for example within the range from 0.001 to 1 mole/liter, preferably from 0.05 to 0.5 mole/liter. Preferably, the higher concentrations will be used at low temperature and the lower concentrations at high temperature.

The polymer hydrolysis caused by the basic agent is more or less rapid. It is more rapid as the temperature and the amount of alkaline agent increase. If necessary, by preliminary test, conducted in the laboratory, it is possible to approximately determine the hydrolysis time and the necessary amount of basic agent. Temperatures from 30° to 100° C., for example 50° to 100° C., provide for a reasonably rapid hydrolysis.

EXAMPLES

The following examples illustrate the advantages obtained by the process of the invention as compared to conventional processes using hydrolyzed polyacrylamides. These examples are not to be considered as limiting in any way the scope of the invention.

EXAMPLES 1 TO 3

A series of tests has been conducted on three different media in order to determine the influence of the reservoir rock permeability and nature on the efficiency of the process according to the invention. An aqueous solution is first prepared with a non-hydrolyzed polyacrylamide, AD 10, produced by Rhône-Poulenc Company, of molecular weight close to $10.10^6$, dissolved at a concentration of 2,500 mg/liter (2,500 ppm) in a water of 2 g/l KCl salt content. The relative viscosity, at zero gradient, $\eta_{ro}$, was found equal to 30.

Three different porous media, of previously determined permeability to water, have been used (Table I). The above-prepared polymer solution is injected at low velocity into each porous medium, initially saturated with 2 g/l KCl water, up to complete saturation with polymer of the porous media. The polymer excess is then washed away with water containing 2 g/l of KCl, until no polymer can be detected in the effluents from the various porous media. The result a lower value of permeability to water for each of the porous media, as well as a decrease of the permeability to water caused by the presence of the polymer. This is calculated as the ratio of the initial permeability to the final permeability after passage of the polymer. The thickness of the polymer layer adsorbed onto the porous medium ($\delta$) may be calculated from values of permeability reduction by the following relationship:

$$R_k = \frac{1}{\left(1 - \frac{\delta}{r_p}\right)^4}$$

wherein:
$r_p$ is the average pore radius of about $$\sqrt{\frac{8k}{\phi}}$$

$\Phi$ is the porosity
$R_k$ is the permeability reduction

Then a 0.1N KOH aqueous solution is injected into the different porous media, up to saturation thereof, the porous media being placed for 3 hours in a stove thermoregulated at 80° C. so as to hydrolyze the polymer. As above, water of 2 g/l KCl content is then injected until the effluents reach a substantially neutral pH. Permeability to water after hydrolysis of the adsorbed polymer, and calculated thickness of the adsorbed layer are deduced therefrom. It is observed, in all the tests, that the permeability reductions are more substantial with the hydrolyzed polymer than with the non-hydrolyzed polymer and increase with the clay content of the porous media, and also that the calculated thickness of the adsorbed layer substantially doubles after polymer hydrolysis.

TABLE I

| Example | Porous medium | Clays % | Permeability ($\mu$m) | Non-hydrolyzed polyacrylamide | | Polyacrylamide after hydrolysis | |
|---|---|---|---|---|---|---|---|
| | | | | $R_k$ | $\delta$ ($\mu$m) | $R_k$ | $\delta$ ($\mu$m) |
| 1 | clayish sandstone | 3 | 1.750 | 1.7 | 1.4 | 2.6 | 2.3 |
| 2 | clayish sand | 5 | 4.6 | 2.6 | 2.1 | 9.7 | 4.3 |
| 3 | clayish sand | 15 | 0.450 | 9 | 1.4 | 940 | 2.7 |

EXAMPLE 4

This example illustrates the prior art by a test simulating the reduction of permeability to water in a block of clayish sandstone resulting from the injection of an already hydrolyzed commercial polyacrylamide.

A hydrolyzed polyacrylamide (molecular weight approximately of $7.5 \cdot 10^6$) containing about 30% acrylate groups, referenced Pusher 700 of Dow Chemical, is dissolved at a concentration of 2,500 mg/l in water containing 2 g/l of KCl ($\eta_{ro}=360$) and injected into a clayish sandstone having the same characteristics and in the same conditions as in example 1. After injection of the polymer into the porous medium, the non-adsorbed polymer is displaced by means of water containing 2 g/l of KCl, as in example 1, and the measured permeability reduction is of 1.8 as compared with the preceding value of 2.6. It is observed that this process of the prior art has a less-marked effect than the process of the invention on said porous medium of low clay content. Obviously, said difference between the permeability reduction values would still increase for media of higher clay content.

EXAMPLE 5

This example shows the influence of residual oil on the reduction of permeability to water after application of the process according to the invention, and the effect of the treatment on the oil flow.

The same clayish sandstone as in example 1 is saturated with 2 g/l KCl water and said water is then displaced by a refined oil of viscosity close to 2 centipoise. The permeability to oil at a saturation Sw=50% is then: $k_o=1$ $\mu$m$^2$. The oil in the porous medium is then displaced with 2 g/l KCl water up to a residual saturation with oil $S_{or}=37\%$. The permeability to water in the presence of residual oil is 0.095 $\mu$m$^2$.

The same procedure as in example 1 is then used by successively injecting into the porous medium a small flow of non-hydrolized polyacrylamide, AD at a concentration of 2,500 mg/l in 2 g/l KCl water, and then 2 g/l aqueous KCl until the non-adsorbed polymer is completely displaced. The reduction in permeability to water in the presence of residual oil is 5.5. This value is to be compared with the permeability reduction of 1.7 previously obtained in example 1 in the absence of residual oil.

Next, the adsorbed polyacrylamide is hydrolyzed in situ by saturating the porous medium with 0.1N KOH. As in example 1, the porous medium is placed into an enclosure, thermoregulated at 80° C. for 3 hours and the excess base is then displaced by 2 g/l aqueous KCl. The measured reduction of the permeability to water after polymer hydrolysis is 16, compared with the value of 2.6 obtained in example 1.

Finally, the same oil as above is injected into the porous medium and the permeability to oil is thus determined. It is identical to the initial permeability in the absence of polymer ($k_o=1$ $\mu$m$^2$ at a saturation Sw=50%). The permeability reduction is hence equal to 1 and the use of the process does not change the oil flow.

Experiments identical to examples 2 and 3, but conducted in the presence of residual oil, confirm the above results, i.e an unmodified permeability to oil but a greater reduction of permeability to water in the presence of residual oil after supply of non-hydrolyzed polyacrylamide followed with its hydrolysis in situ.

EXAMPLE 6

An experiment similar to that of example 5 was conducted to demonstrate an application in the field for reducing the water inflows in a gas storage well.

The permeability to water and to gas of a clayish sandstone originating from the reservoir prior to treatment was 0.420 $\mu$m$^2$. After introduction of hydrolyzed polyacrylamide AD 10 of (Rhône-Poulenc), in proportion of 2,500 mg/liter, into the production water (total salt content of about 1 g/l) and displacement of said water, the reduction permeability to water was 2.8. The polymer was hydrolyzed in situ by 0.5N KOH for 24 hours at 35° C., then the excess base displaced by the reservoir water. The reduction in permeability to water after polymer hydrolysis was 7.3.

During said experiment it has been possible to show that the rate of gas production (81 liters/hour) was not changed by the polymer supply and its hydrolysis in situ.

What is claimed as the invention is:

1. A process for the selective reduction of water inflows from an oil or gas producing formation towards a production well, comprising the successive steps of:
   (a) injecting from a production well, into at least a part of the formation, an aqueous dispersion or solution of a non-hydrolyzed polyacrylamide or of a nonhydrolyzed copolymer of acrylamide with at least one other comonomer,
   (b) injecting from said production well into said part of the formation an alkali metal basic compound and maintaining conditions providing for an at least partial hydrolysis of the polyacrylamide or of the copolymer, so as to plug said part of the formation selectively with hydrolyzed polyacrylamide or copolymer of acrylamide with at least one other comonomer, and
   (c) placing said production well in condition of oil or gas production and recovering the produced oil or gas from said selectively plugged formation containing said hydrolyzed polyacrylamide or copolymer through said production well.

2. A process according to claim 1, wherein the aqueous dispersion or solution comprises a non-hydrolyzed copolymer of acrylamide with N-vinylpyrrolidone or with a vinyl ester or ether.

3. A process according to claim 1, wherein the polyacrylamide or copolymer concentration of the aqueous dispersion or solution is from 200 to 30,000 ppm by weight.

4. A process according to claim 1, wherein the polyacrylamide or copolymer molecular weight is at least 500,000.

5. A process according to claim 1, wherein the basic compound is an alkali metal hydroxide, carbonate, phosphate, alcoholate or silicate.

6. A process according to claim 5, wherein the basic compound is ammonium, sodium or potassium carbonate or hydroxide.

7. A process according to claim 5, wherein the basic compound is an alkali metal hydroxide as a 0.001 to 1 mole/liter aqueous solution.

8. A process according to claim 7, wherein the concentration of alkali metal hydroxide solution is from 0.05 to 0.5 mole/liter.

* * * * *